(12) United States Patent
Matsui

(10) Patent No.: US 6,626,618 B2
(45) Date of Patent: Sep. 30, 2003

(54) MACHINE TOOL

(75) Inventor: Satoshi Matsui, Yamatokoriyama (JP)

(73) Assignee: Mori Seiki Co, Ltd., Yamatokoriyama (JP)

( * ) Notice: Subject to any disclaimer, the term of this patent is extended or adjusted under 35 U.S.C. 154(b) by 0 days.

(21) Appl. No.: 09/950,711

(22) Filed: Sep. 13, 2001

(65) Prior Publication Data

US 2002/0034426 A1 Mar. 21, 2002

(30) Foreign Application Priority Data

Sep. 19, 2000 (JP) ........................................ 2000-282769

(51) Int. Cl.[7] .............................................. B23C 00/00
(52) U.S. Cl. ................. 409/134; 408/234; 29/DIG. 56; 29/DIG. 94
(58) Field of Search .......................... 409/134; 408/234; 29/DIG. 56, DIG. 94

(56) References Cited

U.S. PATENT DOCUMENTS

| | | | | |
|---|---|---|---|---|
| 4,310,270 A | * | 1/1982 | Kraus | 408/234 |
| 4,863,319 A | * | 9/1989 | Winkler et al. | 29/DIG. 56 |
| 4,966,505 A | * | 10/1990 | Winkler et al. | 29/DIG. 56 |
| 5,056,969 A | * | 10/1991 | Nerland et al. | 29/DIG. 94 |
| 5,435,675 A | * | 7/1995 | Rutschle | 29/DIG. 56 |
| 6,120,222 A | * | 9/2000 | Hiramoto et al. | 409/134 |

FOREIGN PATENT DOCUMENTS

| | | |
|---|---|---|
| DE | 196 13 641 | 8/1997 |
| JP | 10-249666 | 9/1998 |

* cited by examiner

*Primary Examiner*—A. L. Wellington
*Assistant Examiner*—Dana Rose
(74) *Attorney, Agent, or Firm*—Armstrong, Westerman & Hattori, LLP

(57) ABSTRACT

According to the present invention, there is provided a vertical machining center (1) which has working regions ($\alpha$, $\beta$) separable by a partition plate (P), and comprises a spindle head (15) adapted to move within one of the working regions ($\alpha$, $\beta$) separated by the partition plate (P) in a first machining mode and to move across the working regions ($\alpha$, $\beta$) not separate by the partition plate (P) in a second machining mode, and a stopper (20) which prevents the spindle head (15) from moving from the one working region into the other working region in the first machining mode and permits the spindle head (15) to move between the working regions ($\alpha$, $\beta$) in the second machining mode. The stopper (20) includes a movable stopper member (21) attached to a saddle (13) and stationary stopper members (26,27) attached to a bed (11). With this arrangement, machining ranges to be defined in the respective working regions can be maximized without the need for consideration of the coasting distance of the saddle at abnormal stoppage.

4 Claims, 7 Drawing Sheets

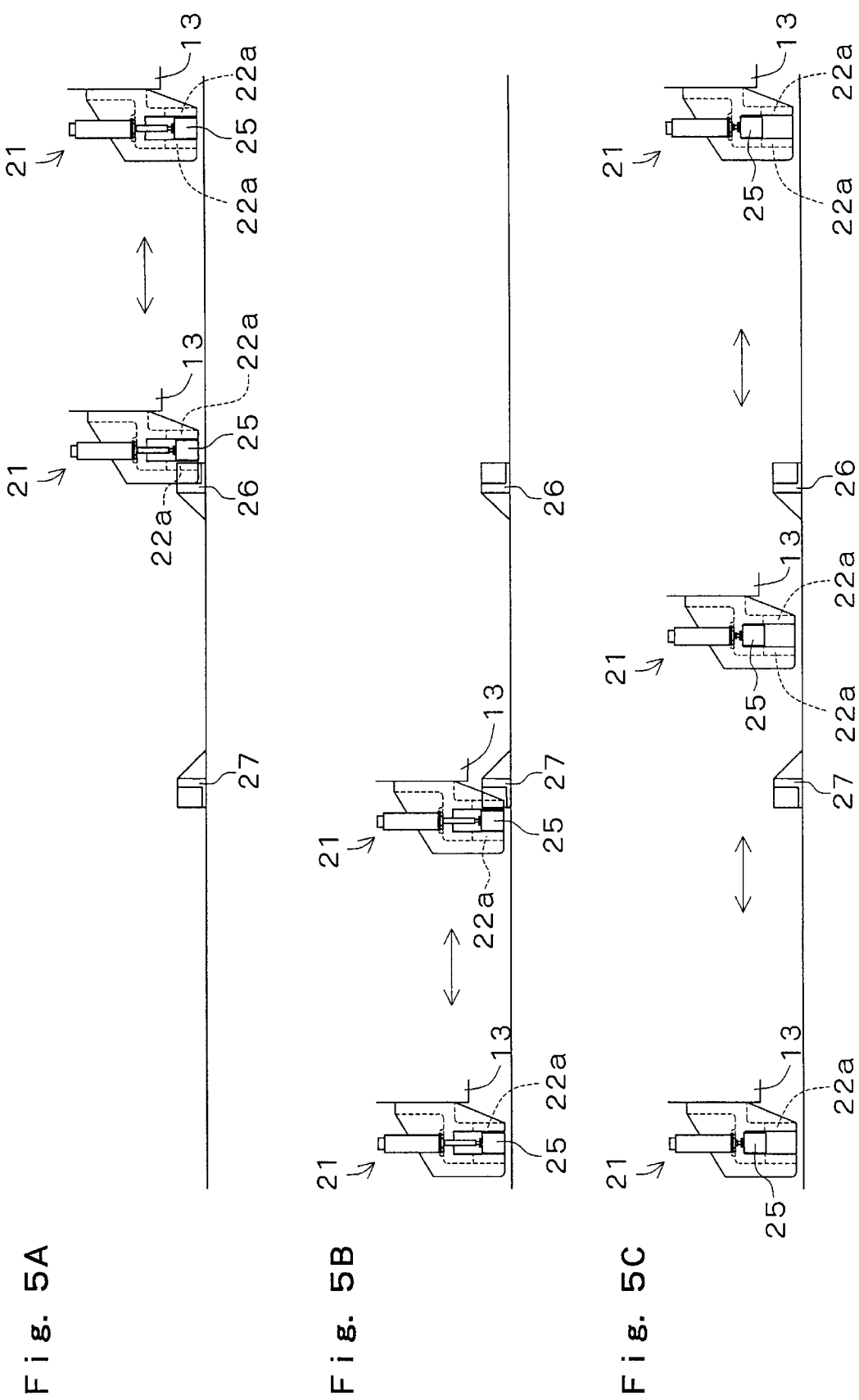

MACHINE TOOL

BACKGROUND OF THE INVENTION

1. Field of the Invention

The present invention relates to a machine tool having a plurality of working regions located adjacent each other, and comprising a movable body such as a spindle head or a headstock which is adapted to move within any one of the working regions in a first machining mode and to move across the plurality of working regions in a second machining mode.

2. Description of the Prior Art

In a vertical machining center of long table type, for example, a partition plate is placed upright at a longitudinally middle position of a long table to split the long table into two working regions in a first machining mode and, when a workpiece is machined in one of the working regions, a set up operation for machining the next workpiece is performed in the other adjacent working region. In a second machining mode, the partition plate is removed, whereby a single working region is provided on the entire long table for machining an elongate workpiece.

The vertical machining center typically includes a saddle movable longitudinally of the long table (along the X-axis) on a bed disposed behind the long table, a column disposed upright on the saddle and movable back and forth (along the Y-axis), and a spindle head provided on a front face of the column and vertically movable (along the Z-axis). A workpiece is machined with the column and the spindle head projecting over the long table.

In the vertical machining center, as described above, the long table is available not only to provide the two working regions separated by the partition plate but also to provide the single working region. Therefore, it is impossible to mechanically limit the movement of the saddle mounted with the spindle head to allow the spindle head to move only within each of the working regions separated by the partition plate, but the saddle is allowed to freely move from one end to the other end of the long table.

Where a workpiece is to be machined in either of the working regions separated by the partition plate in the vertical machining center, the movement of the saddle is controlled on a software basis by an NC apparatus so as to prevent the spindle head (or a spindle head cover) and the column (or a column cover) projecting over the table from colliding against the partition plate when moving along the X-axis.

Further, limit switches, for example, are provided as detection means on opposite sides of the partition plate to prevent the collision of the column, the spindle head and the like against the partition plate which may otherwise result in injury to an operator performing a set up operation in the adjacent working region when the NC apparatus fails to properly control the movement of the saddle under abnormal conditions. When the detection means detects the saddle or the column in an unintended region, a power supply to a servo motor for driving the saddle is forcibly cut off to stop the movement of the saddle.

Even if the power supply to the servo motor is cut off, the saddle does not immediately stop moving, but stops after having moved a certain distance under its own inertia. Therefore, a machining range, i.e., the movement range of the spindle head and the like along the X-axis, is defined in each of the working regions separated by the partition plate in consideration of the coasting distance of the saddle at abnormal stoppage.

Where the long table is split into the two working regions by the partition plate, the machining ranges in the respective working regions in which the spindle head and the like are actually permitted to move along the X-axis are diminished to a certain extent with respect to the entire working regions. If an attempt is made to provide sufficient machining ranges in the respective working regions, on the contrary, the machine tool entirely has a greater size, requiring a greater installation space.

Particularly, where the saddle mounted with the column and the spindle head has a greater weight or a higher rapid traverse rate, the coasting distance of the saddle at the abnormal stoppage is increased. Accordingly, the aforesaid problem is more remarkable.

It is therefore an object of the present invention to provide a machine tool having a plurality of working regions located adjacent each other, and comprising a movable body such as a saddle which is adapted to move within any one of the working regions in a first machining mode and to move across the plurality of working regions in a second machining mode, wherein a machining range to be defined within each of the working regions is maximized without the need for consideration of the coasting distance of the movable body at abnormal stoppage.

SUMMARY OF THE INVENTION

In accordance with the present invention to achieve the aforesaid object, there is provided a machine tool, which has a plurality of working regions located adjacent each other, and comprises a movable body adapted to move within any one of the working regions in a first machining mode and to move across the plurality of working regions in a second machining mode, and a stopper which prevents the movable body from moving from the one working region into the other working region in the first machining mode and permits the movable body to move from the one working region into the other working region in the second machining mode.

In the machine tool having the aforesaid construction, the movable body is permitted to freely move across the plurality of working regions in the second machining mode. In the first machining mode, on the other hand, the stopper forcibly prevents the movable body from moving from the one working region into the other working region. This obviates the need for defining a limited machining range in each of the working regions in the first machining mode in consideration of the coasting distance of the movable body at abnormal stoppage as in the conventional machine tool, but makes it possible to define maximum machining ranges in the respective working regions.

Thus, the machine tool provides sufficient machining ranges in the respective working regions, and yet has a compact size. Thus, the installation space of the machine tool can be minimized. Where the movable body has a greater weight or a higher rapid traverse rate and, hence, has a greater coasting distance at the abnormal stoppage, this arrangement is particularly effective.

Where a partition is provided for separating the adjacent working regions from each other in the first machining mode in which the movable body is allowed to move within the one working region, the stopper is preferably adapted to limit the movement range of the movable body to prevent the movable body from colliding against the partition in the first machining mode.

The stopper may comprise a movable stopper member provided in association with the movable body and movable together with the movable body, and a stationary stopper member provided at a fixed position to be brought into abutment against the movable stopper member. In this case, one of the movable stopper member and the stationary stopper member may comprise a base having an opening which allows for passage of the other stopper member, and an open/close mechanism for opening and closing the opening of the base.

BRIEF DESCRIPTION OF THE DRAWINGS

FIGS. 5A to 5C are diagrams for explaining the operation of a stopper attached to the machine tool;

DETAILED DESCRIPTION OF THE PREFERRED EMBODIMENTS

Figure 1:
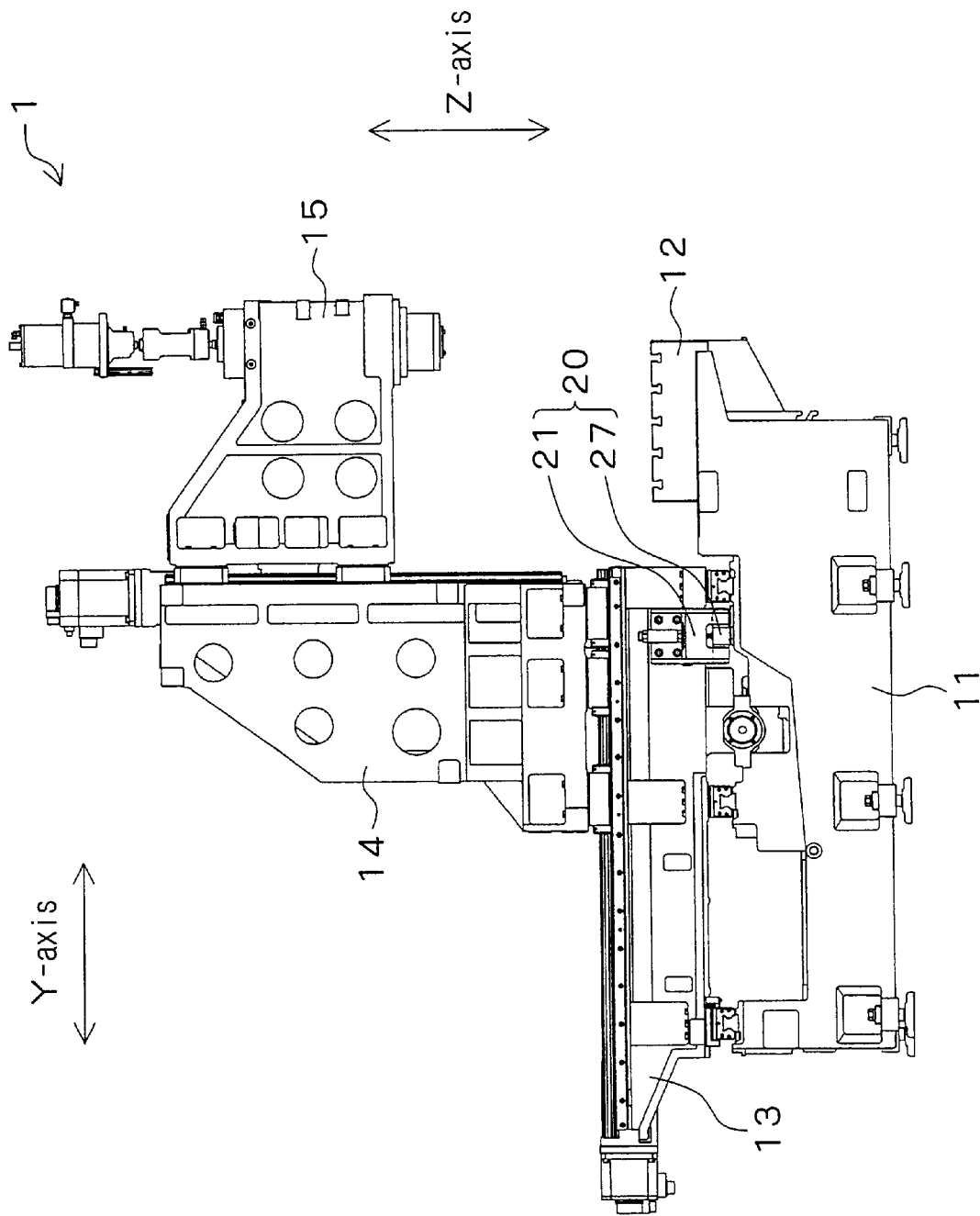
FIG. 1 is a side view illustrating a machine tool according to one embodiment of the present invention.
Figure 2:
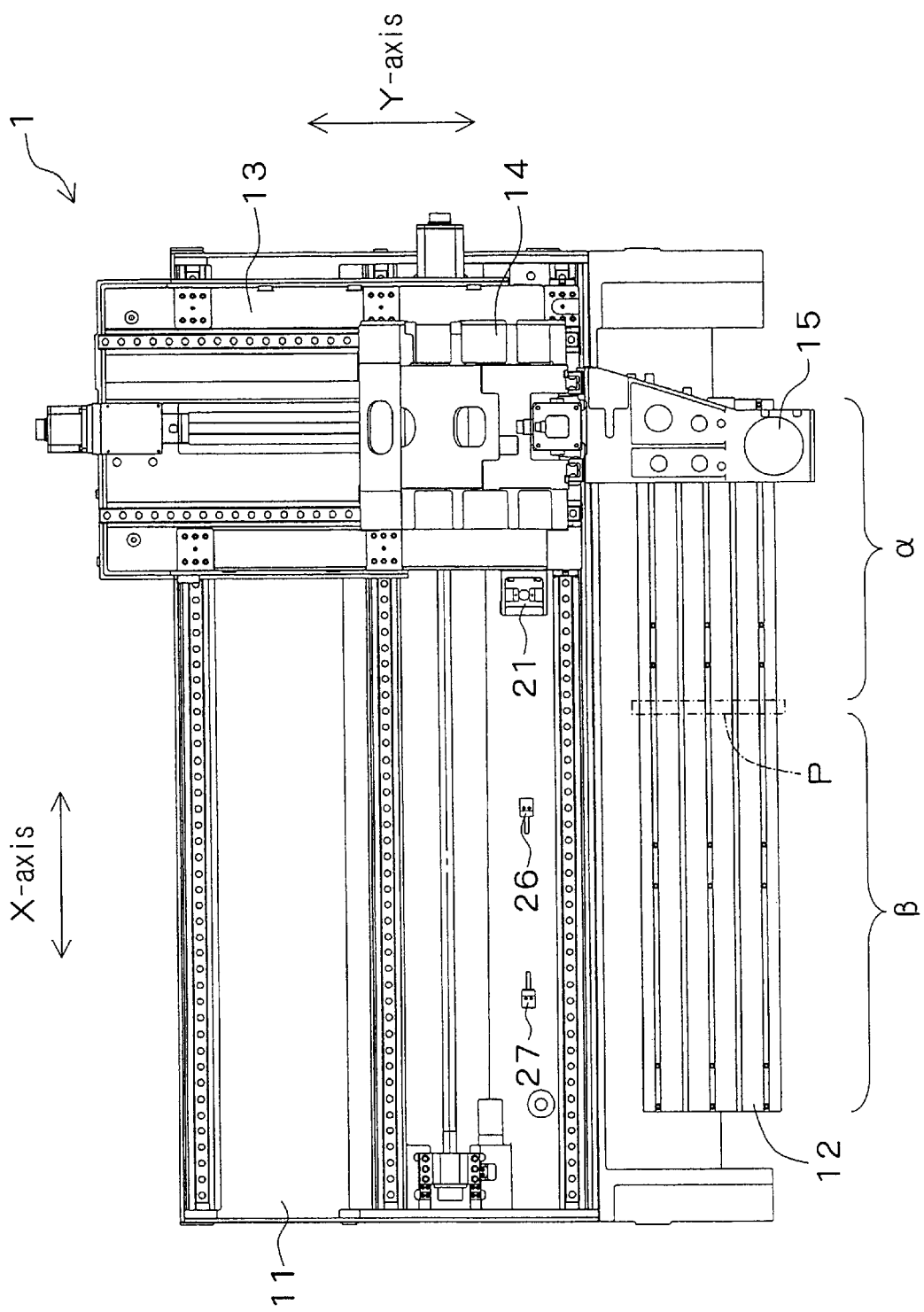
FIG. 2 is a plan view of the machine tool.
Figure 3:
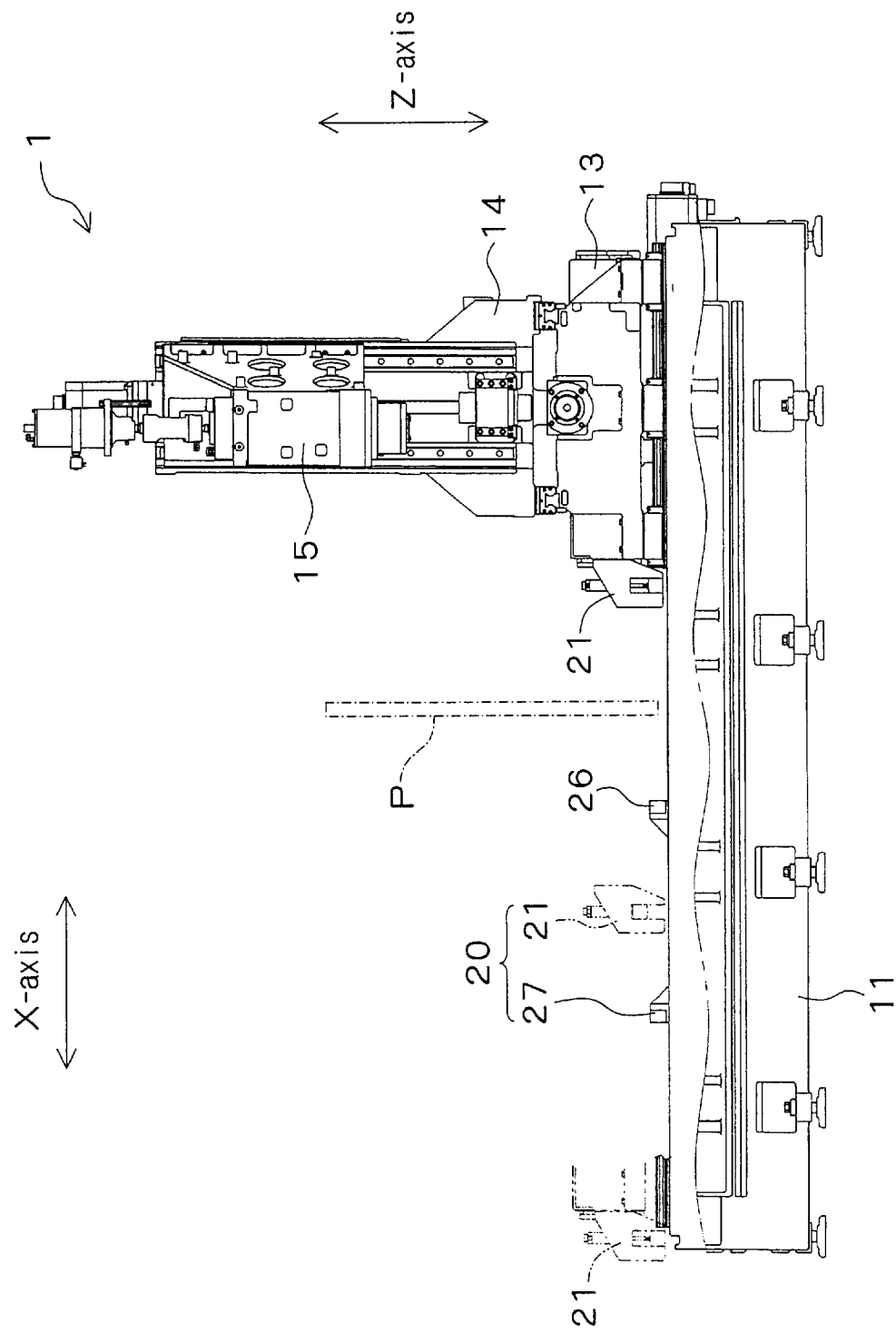
FIG. 3 is a front view of the machine tool.

Embodiments of the present invention will hereinafter be described with reference to the attached drawings. As shown in FIGS. 1 to 3, a vertical machining center 1 includes a long table 12 fixed to a front portion of a bed 11, a saddle 13 movable longitudinally of the long table 12 (along the X-axis) on a slideway provided on a rear portion of the bed 11, a column 14 movable back and forth (along the Y-axis) on a slideway of the saddle 13, a spindle head 15 vertically movable (along the Z-axis) on a slideway provided on a front face of the column 14, and a stopper 20 for limiting the movement of the saddle 13 along the X-axis. During a machining operation, forward movement of the column 14 causes the spindle head 15 to project over the long table 12, thereby allowing for machining of a workpiece fixed to the long table 12.

In the vertical machining center 1, a partition plate P can removably be placed upright at a generally longitudinally middle position of the long table 12 as shown in FIGS. 2 and 3. In a first machining mode, the partition plate P is placed upright on the long table 12 to split the long table 12 into two working regions α and β. Therefore, when a workpiece is machined in one working region α, a set up operation for machining the next workpiece can be performed in the other working region β. In a second machining mode, the partition plate P is removed from the long table 12, whereby a single working region is provided on the entire long table 12 for machining an elongate workpiece.

In the first machining mode in which the partition plate P is placed upright on the long table 12 to split the long table 12 into the two working regions α and β as described above, the movement of the saddle 13 along the X-axis is controlled by an NC apparatus (not shown) to prevent collision of the spindle head 15 against the partition plate P which may occur due to limitless movement of spindle head 15 along the X-axis when the workpiece is machined in the working region α. When the spindle head 15 is moved to the working region β for the machining of the next workpiece after completion of the machining of the workpiece in the working region α, the column 14 is retracted rearward. That is, the spindle head 15 is moved between the working regions α and β without projecting over the long table 12, so that the partition plate P does not interfere with the movement of the spindle head 15.

Thus, the movement ranges of the saddle 13 (spindle head 15) along the X-axis in the respective machining modes are basically controlled by the NC apparatus but, in consideration of abnormal conditions under which the NC apparatus fails to properly control the movement of the saddle 13, a limit switch (not shown) is additionally provided for detection of the spindle head 15 moving into an off-limits region defined in the vicinity of the partition plate P. When the limit switch detects the spindle head 15 moving into the off-limits region, a power supply to a servo motor for axially moving the saddle 13 is cut off to forcibly stop the movement of the saddle 13 along the X-axis. Even if the power supply to the servo motor is cut off, the saddle 13 does not immediately stop moving, but stops after having moved a certain distance under its own inertia as described above.

Figure 4A:
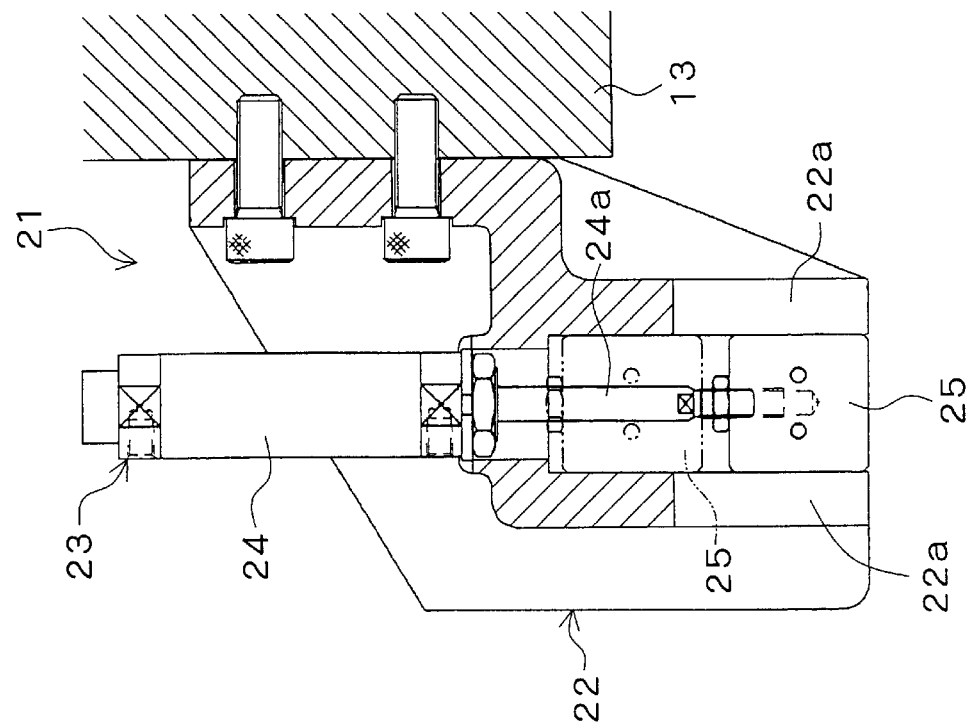
FIGS. 4A and 4B are a front view and a sectional view, respectively, illustrating a movable stopper member attached to the machine tool.
Figure 4B:
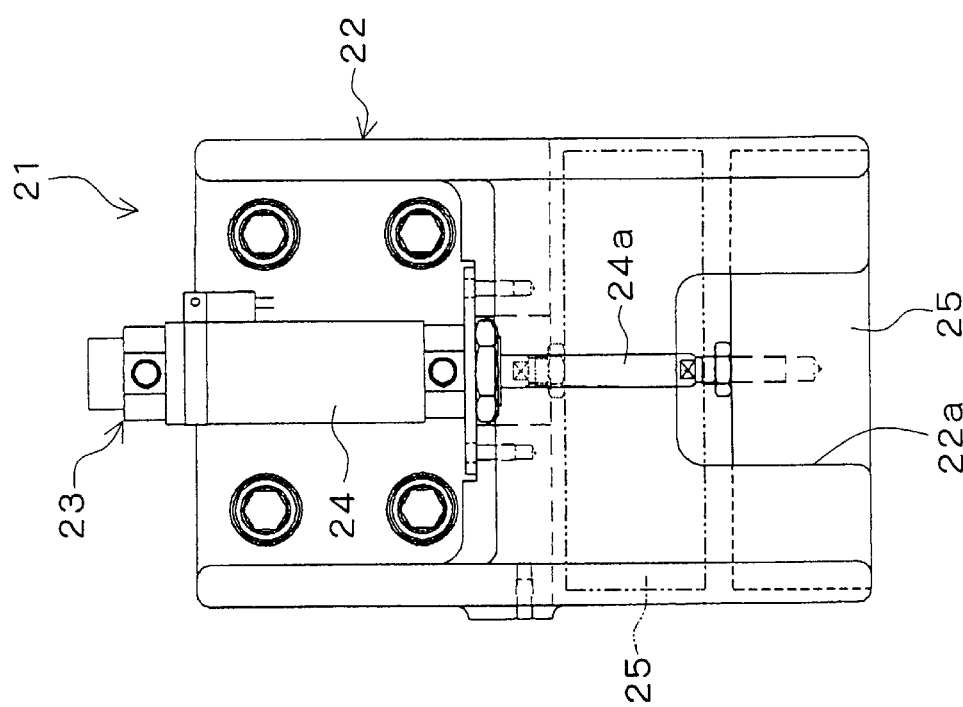

As shown in FIGS. 1 to 3, 4A and 4B, the stopper 20 includes a movable stopper member 21 attached to a left side face of the saddle 13, and two stationary stopper members 26, 27 attached to the bed 11. As shown in FIGS. 4A and 4B, the movable stopper member 21 includes a base 22 having an opening 22a which allows for passage of the stationary stopper members 26, 27, and an open/close mechanism 23 for opening and closing the opening 22a of the base 22.

The open/close mechanism 23 includes a cylinder 24 fixed to the base 22, and a closure member 25 attached to a piston rod 24a of the cylinder 24. As indicated by a solid line and a chain double-dashed line in FIGS. 4A and 4B, the closure member 25 is moved up and down in the base 22 to open and close the opening 22a of the base 22.

The stationary stopper members 26, 27 are each disposed on a path of the movement of the movable stopper member 21 attached to the saddle 13. When a workpiece is machined in the right working region a in the first machining mode in which the long table 12 is split into the two working regions α and β by providing the partition plate P, the stationary stopper member 26 is disposed at a position on the left side of the movable stopper member 21 to prevent the spindle head 15 from colliding against the partition plate P even if the movable stopper member 21 moves along with the saddle 13 to that position. When a workpiece is machined in the left working region β in the first machining mode, the stationary stopper member 27 is disposed at a position on the right side of the movable stopper member 21 to prevent the spindle head 15 from colliding against the partition plate P even if the movable stopper member 21 moves along with the saddle 13 to that position.

With reference to FIGS. 5A to 5C, an explanation will be given to the operation of the stopper 20 in the vertical machining center 1 having the aforesaid construction. In the first machining mode in which the long table 12 is split into the two working regions α and β by providing the partition plate P, the closure member 25 is lowered, so that the opening 22a of the movable stopper member 21 is constantly closed.

Therefore, when the workpiece is machined within the right working region α, the movable stopper member 21 attached to the saddle 13 is located on the right side of the stationary stopper member 26 and, even if the saddle 13 happens to excessively move to the left (toward the working region β) for some reason, the stationary stopper member 26 abuts against the closure member 25 closing the opening 22a of the movable stopper member 21 thereby to be prevented from passing through the opening 22a as shown in FIG. 5A. Thus, the movement of the saddle 13 is forcibly stopped at that position to assuredly prevent the collision of the spindle head 15 against the partition plate P.

When the workpiece is machined within the left working region β, the movable stopper member 21 attached to the saddle 13 is located on the left side of the stationary stopper member 27 and, even if the saddle 13 happens to excessively move to the right (toward the working region α) for some reason, the stationary stopper member 27 abuts against the closure member 25 closing the opening 22a of the movable stopper member 21 thereby to be prevented from passing through the opening 22a as shown in FIG. 5B. Thus, the movement of the saddle 13 is forcibly stopped at that position to assuredly prevent the collision of the spindle head 15 against the partition plate P.

In the second machining mode in which a single working region is provided on the long table 12 with the partition plate P being removed, the closure member 25 is moved up as shown in FIG. 5C, so that the opening 22a of the movable stopper member 21 is constantly open. Since the stationary stopper members 26, 27 can pass through the opening 22a of the movable stopper member 21, the saddle 13 is permitted to freely move from one end to the other end of the bed 11. Accordingly, the spindle head 15 is permitted to freely traverse the long table 12.

Figure 6:
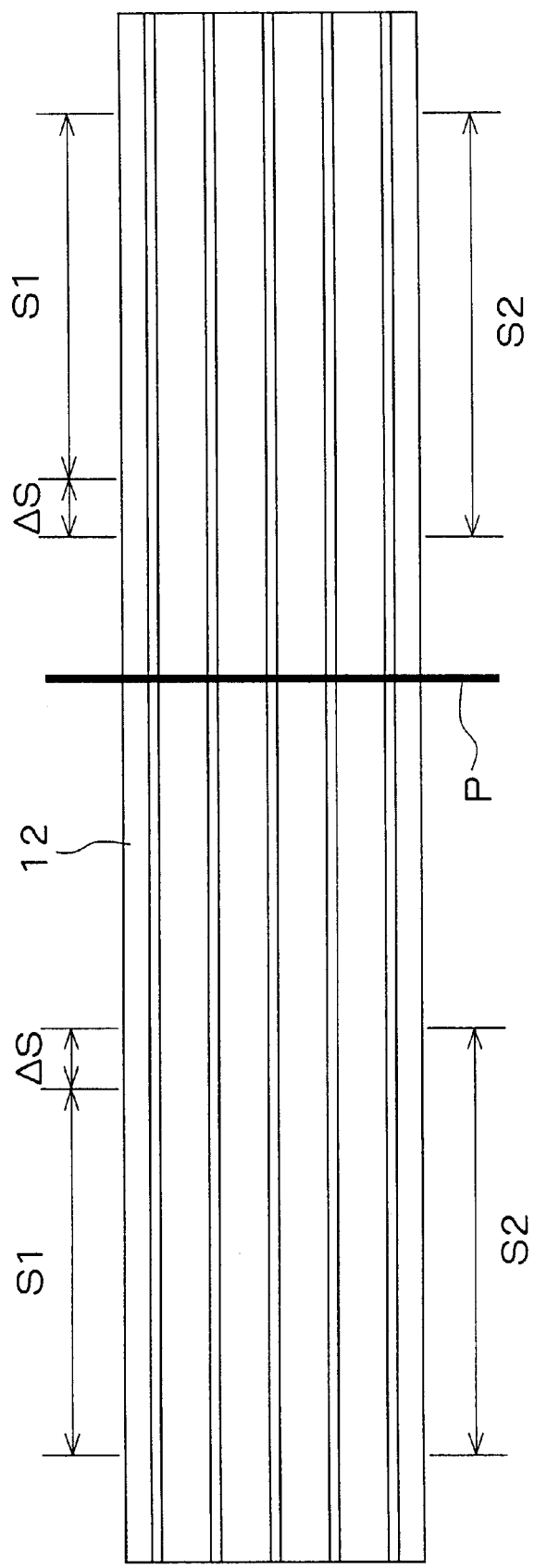
FIG. 6 is a diagram showing a machining range in the machine tool.

In the vertical machining center 1, as described above, the spindle head 15 can freely move between the working regions α and β in the second machining mode in which the single working region is provided on the long table 12. In the first machining mode in which the long table 12 is split into the two working regions α and β by providing the partition plate P, the stopper 20 assuredly prevents the spindle head 15 from moving from the one working region into the other working region. Therefore, the machining ranges (the movement ranges of the spindle head 15) to be defined in the respective working regions α and β can be maximized without the need for consideration of the coasting distance of the saddle 13 at the abnormal stoppage.

Where the aforesaid stopper 20 is not provided in the vertical machining center 1, for example, the machining ranges (the movement ranges of the spindle head 15) S1 should be defined in consideration of the coasting distance ΔS of the saddle 13 at the abnormal stoppage as shown in FIG. 6. Where the stopper 20 is provided in the vertical machining center, on the other hand, the movement of the saddle 13 can assuredly be stopped with the stationary stopper member 26 or 27 abutting against the movable stopper member 21, obviating the need for consideration of the coasting distance ΔS of the saddle 13 at the abnormal stoppage. Therefore, the machining ranges (the movement ranges of the spindle head 15) can be defined to be S2 (=S1+ΔS) in FIG. 6.

Thus, the vertical machining center 1 provides sufficient machining ranges in the respective working regions α and β, and yet has a compact size. Thus, the installation space of the vertical machining center 1 can be minimized. This arrangement is particularly effective where the saddle 13 mounted with the column 14 and the spindle head 15 has a greater weight or a higher rapid traverse rate and, hence, has a greater coasting distance at the abnormal stoppage.

Although the two-component stopper 20 is employed which includes the movable stopper member 21 attached to the saddle 13 and the stationary stopper members 26, 27 attached to the bed 11 in the embodiment described above, the construction of the stopper 20 is not limited thereto. For example, a one-component stopper may be employed which is adapted to project from the bed 11, as required, to forcibly stop the movement of the saddle 13 in abutment against a side face of the saddle 13.

Although the stopper 20 is constructed such that the base 22 of the movable stopper member 21 attached to the saddle 13 has the opening 22a which allows for passage of the stationary stopper members 26, 27 attached to the bed 11 in the embodiment described above, the construction of the stopper 20 is not limited thereto. For example, the stopper 20 may be constructed such that stationary stopper members each have an opening which allows for passage of a movable stopper member attached to a movable body such as the saddle 13. In this case, however, the stationary stopper members each need to have an open/close mechanism for opening and closing the opening thereof.

In the embodiment described above, the movable stopper member 21 is attached to the saddle 13, and the stationary stopper members 26, 27 are attached to the bed 11. However, the movable stopper member and the stationary stopper members may be attached to any positions or components, as long as the collision of the spindle head 15 against the partition plate P can be prevented.

The embodiment described above is directed to the case where the adjacent working regions α and β are separated by the partition plate P. However, the present invention is applicable to a machine tool which has no partition plate for separating a plurality of working regions located adjacent each other but a movable body thereof is adapted to move within any one of the working regions in a first machining mode and to move across the plurality of working regions in a second machining mode.

Figure 7:
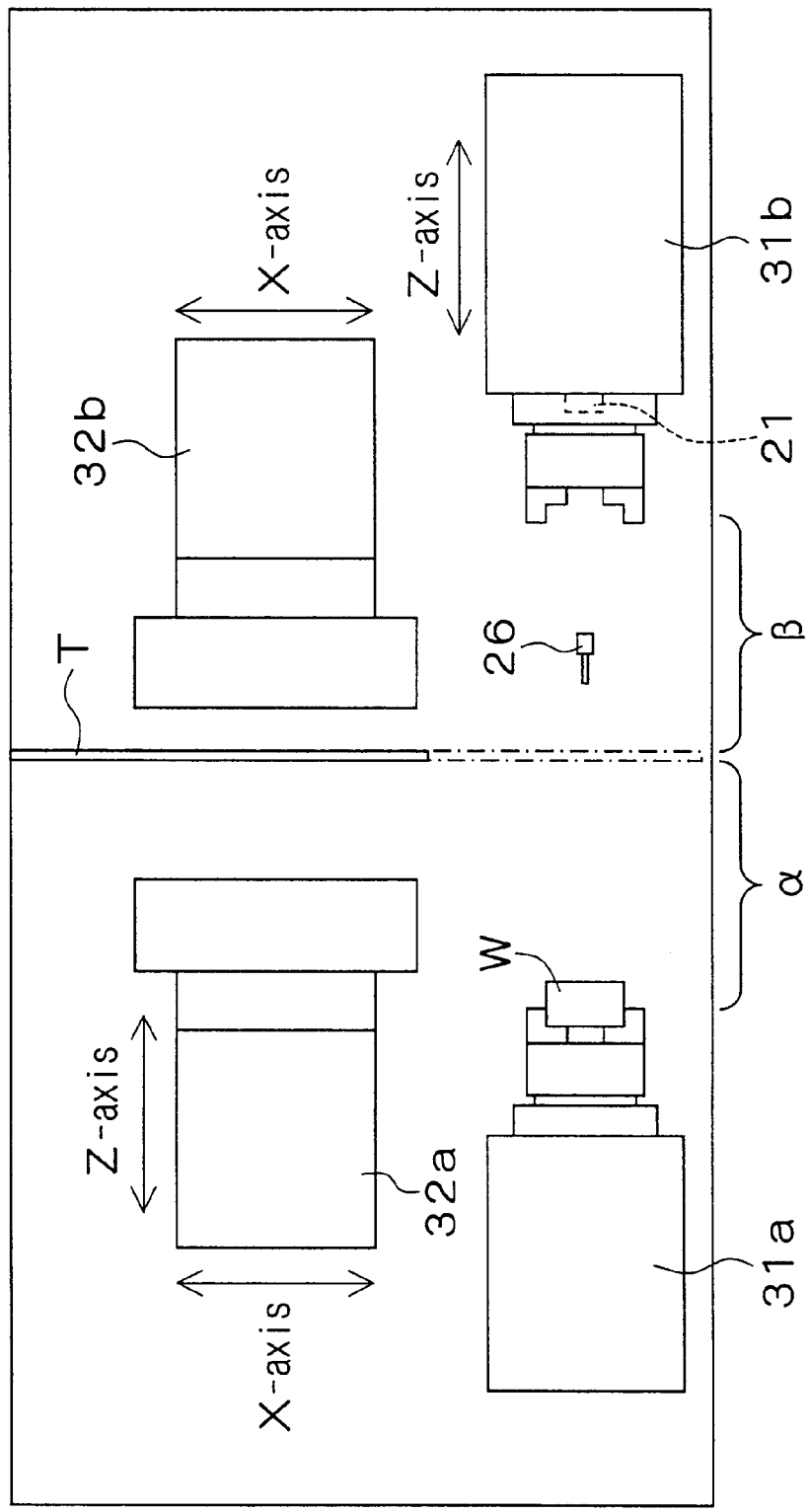
FIG. 7 is a plan view illustrating another embodiment of the invention.

Although the embodiment described above is directed to the vertical machining center 1 provided with the stopper 20, the present invention is applicable to a lathe 2 as shown in FIG. 7. The lathe 2 includes a first headstock 31a and a first turret 32a provided in a left working region (first working region) α, and a second headstock 31b and a second turret 32b provided in a right working region (second working region) β, so that workpieces can simultaneously be machined in the left and right working regions α and β. During the simultaneous machining of the workpieces in the left and right working regions α and β, a shutter T projects between the left and right working regions α and β to separate the working regions α and β from each other as indicated by a chain line in FIG. 7.

The first headstock 31a is fixed to a bed, while the second headstock 31b is movable toward and away from the first headstock 31a along the Z-axis on a slideway of the bed. In the left working region α, the first turret 32a is movable along the X-axis and along the Z-axis for machining the workpiece. In the right working region β, the second headstock 31b is movable along the Z-axis with respect to the second turret 32b which is not movable along the Z-axis for machining the workpiece.

As described above, the lathe 2 can perform not only the simultaneous workpiece machining operation in the left and right working regions α and β but also a continuous double-side workpiece machining operation in an ideal manner without the need for manually changing the orientation of the workpiece. More specifically, a workpiece W is machined by the operations of the first headstock 31a and the first turret 32a, and then the second headstock 31b moves into the left working region α to receive the machined workpiece W from the first headstock 31a and returns into the right working region β, in which the workpiece W is machined from the back side thereof by the operations of the second headstock 31b and the second turret 32b.

In the lathe 2, the second headstock 31b is movable along the Z-axis not only in the right working region β but also across the left and right working regions α and β as described above. Therefore, as shown in FIG. 7, a movable stopper member 21 is attached to the second headstock 31b and a stationary stopper member 26 is provided at a predetermined position on the bed in the right working region β as in the aforesaid vertical machining center 1. Even if the second headstock 31b happens to excessively move toward the left working region a for some reason during the machining of the workpiece in the right working region β, the movable stopper member 21 forcibly stops the movement of the second headstock 31b in abutment against the stationary stopper member 26.

As in the aforesaid vertical machining center 1, the machining range (the movement range of the second headstock 31b) can be defined in the right working region β without the need for consideration of the coasting distance of the second headstock 31b at abnormal stoppage. Therefore, the lathe 2 provides a sufficient machining range, and yet has a compact size.

What is claimed is:

1. A machine tool having a plurality of working regions located adjacent each other, and comprising;
   a movable body adapted to move within any one of the working regions in a first machining mode and to move across the plurality of working regions in a second machining mode; and
   a stopper which prevents the movable body from moving from the one working region into the other working region in the first machining mode and permits the movable body to move from the one working region into the other working region in the second machining mode,
   wherein the stopper comprises a movable stopper member attached to the movable body, and a stationary stopper member provided at a fixed position to be brought into abutment against the movable stopper member,
   wherein the movable stopper member comprises a base having an opening which allows for passage of the stationary stopper member, and an open/close mechanism for opening and closing the opening of the base.

2. A machine tool having a plurality of working regions located adjacent each other, and comprising:
   a movable body adapted to move within any one of the working regions in a first machining mode and to move across the plurality of working regions in a second machining mode; and
   a stopper which prevents the movable body from moving from the one working region into the other working region in the first machining mode and permits the movable body to move from the one working region into the other working region in the second machining mode; and
   a partition for separating the adjacent working regions from each other in the first machining mode,
   wherein the stopper limits a movement range of the movable body to prevent the movable body from colliding against the partition in the first machining mode,
   wherein the stopper comprises a movable stopper member attached to the movable body, and a stationary stopper member provided at a fixed position to be brought into abutment against the movable stopper member,
   wherein the movable stopper member comprises a base having an opening which allows for passage of the stationary stopper member, and an open/close mechanism for opening and closing the opening of the base.

3. A machine tool comprising:
   a bed;
   a long table provided on a front portion of the bed and extending across two adjacent working regions;
   a saddle movable longitudinally of the long table on a slideway of the bed;
   a column movable back and forth on a slideway of the saddle;
   a spindle head vertically movable on a slideway provided on a front face of the column, the spindle head being adapted to move within one of the working regions in a first machining mode and to move across the two working regions in a second machining mode; and
   a stopper which prevents the spindle head from moving from the one working region into the other working region in the first machining mode, and permits the spindle head to move from the one working region into the other working region in the second machining mode,
   wherein the stopper comprises a movable stopper member attached to the saddle, and a stationary stopper member provided at a position on the bed to be brought into abutment against the movable stopper member,
   wherein the movable stopper member comprises a base having an opening which allows for passage of the stationary stopper member, and an open/close mechanism for opening and closing the opening of the base.

4. A machine tool comprising:
   a bed;
   a long table provided on a front portion of the bed and extending across two adjacent working regions;
   a saddle movable longitudinally of the long table on a slideway of the bed;
   a column movable back and forth on a slideway of the saddle;
   a spindle head, vertically movable on a slideway provided on a front face of the column, the spindle head being adapted to move within one of the working regions in a first machining mode and to move across the two working regions in a second machining mode;
   a stopper which prevents the spindle head from moving from the one working region into the other working region in the first machining mode, and permits the spindle head to move from the one working region into the other working region in the second machining mode; and
   a partition plate to be disposed upright on the long table for separating the two adjacent working regions from each other in the first machining mode,
   wherein the stopper limits a movement range of the spindle head to prevent the spindle head from colliding against the partition plate in the first machining mode,
   wherein the stopper comprises a movable stopper member attached to the saddle, and a stationary stopper member provided at a position on the bed to be brought into abutment against the movable stopper member,
   wherein the movable stopper member comprises a base having an opening which allows for passage of the stationary stopper member, and an open/close mechanism for opening and closing the opening of the base.

* * * * *